…

United States Patent Office 2,816,855
Patented Dec. 17, 1957

2,816,855
AQUEOUS DISPERSIONS OF FAT SOLUBLE VITAMINS

Albert E. Sobel, Bayside, N. Y.

No Drawing. Application December 15, 1954
Serial No. 475,555

2 Claims. (Cl. 167—81)

The present invention relates to aqueous dispersions of fat soluble vitamins and more particularly to aqueous dispersions of fat soluble vitamins suitable for intravenous injections of animals.

Previous studies have indicated that the transfer of vitamin A into milk is a function of the level of serum vitamin A, and from this it would appear that maximal transfer of vitamin A can be produced by injecting a given dose intravenously. It should be here noted that intravenous injections could be of importance where oral feeding is not practical for clinical reasons and may further be of importance in aiding diffusion across membranes by providing high concentration gradients in the treatment of conditions where, due to impaired membrane systems, the transfer of vitamin A to a given tissue is impeded. Moreover, in the raising of ruminants and horses, intravenous injections could be a practical way of overcoming the lack of fat soluble vitamins which frequently occurs in these animals.

However, it has been found that dispersing agents when used in intravenous injections have caused hemolysis of the red blood cells therefore making it difficult to render practicable the intravenous injection of the aqueous dispersions of fat soluble vitamins.

In view of the impracticability of intravenous injections, heretofore, little appears to be known of the transfer to milk of vitamin A injected intravenously nor has there been any comparison of the foregoing transfer with that following oral doses of oily and aqueous vitamin A.

Among the objects of the invention, therefore, is to provide a dispersion of fat soluble vitamins suitable to be injected intravenously into animals.

Among other objects of the invention is to provide fat soluble vitamin dispersions which show negligible hemolysis effects on the blood of animals injected intravenously with said dispersion.

Among other objects of the invention is to provide fat soluble vitamin dispersions which are considerably more effective to increase the vitamin concentration in the blood of animals and in the milk of ruminants that the same or similar preparations which are fed orally.

It has also been found that whereas several dispersing agents may be employed for producing injectable dispersions of vitamins E which dispersions do not cause hemolysis of red blood cells, such dispersing agents are unsatisfactory when employed for making dispersions of vitamin A compounds since when injected into the blood these dispersing agents are not effective in maintaining a dispersion of the vitamin A compound in the blood. Another phase of this invention is based on the discovery that a dispersion containing sorethytan oleate and vitamin A esters is unique in providing a dispersion of a vitamin A compound which will not cause hemolysis of the red blood cells and which will effectively maintain the dispersed vitamin A compound in the blood stream into which the dispersion is injected. If vitamin A alcohol or another sorethytan ester is employed the vitamin A alcohol rapidly disappears from the blood stream.

Various sorethytan esters of higher fatty acids may be employed for the vitamin E dispersions. The sorethytan monolaurate, monopalmitate, monostearate, monooleate, etc., are examples of satisfactory dispersing agents for the vitamin E dispersions. The sorethytan esters is the accepted term for the polyoxyethylene derivatives of sorbitan esters; derivatives containing approximately 20 oxyethylene units per molecule of esters are very satisfactory. For the dispersion of vitamin A only the sorethytan monooleate is capable of maintaining the vitamin A in dispersion when injected in the blood stream. A sorethytan monooleate containing about 20 polyoxyethylene units is very satisfactory.

The sorethytan esters are added to the dispersion in amounts so that they will be present in the blood in the proportion of between about 30 to about 300 mg. per 100 ml. of blood. In concentrations up to 200 mg. per 100 ml. of blood the red cells of the blood substantially completely resist hemolysis. At 300 mg. per 100 ml. of blood only 2–4% hemolysis occurs so that proportions even slightly in excess of 300 mg. per 100 ml. of blood may be employed.

The aqueous liquid employed to make the dispersion is an isotonic solution containing 0.85% NaCl. Since the isotonic aqueous dispersion is added to the blood stream of a much greater volume the proportion of dispersing agent and vitamin in the dispersion may vary within relatively wide limits. The proportion of dispersing agent, for example, may be between 0.005 to 0.06 g. per ml. of dispersion.

The vitamins or vitamin esters are added to the dispersion in amounts of .0001 to 0.1% by weight of the solution.

Various other objects and advantages will become apparent from the detailed description to follow.

The following tests were conducted to show the hemolysis effects of the sorethytan laurate.

EXAMPLE 1

A preparation containing 10 g. of sorethytan laurate and 1.25 g. of oily vitamin A concentrate dispersed in 100 ml. of 0.85% NaCl solution was added in increasing amounts to 0.5 ml. of heparinized whole blood. The mixture was incubated at 37° C. for 24 hours. The hemolytic effect of sorethyan laurate plus vitamin A concentrate was measured in the following manner: The incubated samples were diluted to 10.0 ml. with Ringer's solution and centrifuged to separate the intact red cells. A 1.0 ml. aliquot of the supernatant fluid was removed and diluted to 10.0 ml. with distilled water. The optical density of the solution was determined at 548 mu in the Coleman Universal spectrophotometer. Optical density readings were converted into percent hemolysis by means of calibration curves prepared by completely hemolyzing a 1.0 ml. aliquot of the blood specimen being investigated with 19.0 ml. of distilled water. 0.1, 0.2, 0.3 and 1.0 ml. aliquots, respectively, were removed and diluted to 10.0 ml. with distilled water. These dilutions represent 10%, 20%, 30% and 100% respectively. The results are shown in Table 1. Apparently the red cells in heparinized whole blood resisted hemolysis in the presence of as much as 200 mg. of sorethytan laurate per 100 ml. of blood and in the presence of 300 mg. per 100 ml. of blood only 2 to 4% hemolysis took place.

TABLE I

[Percent hemolysis of heparinized whole rabbit blood after incubation at 37° C. for 24 hours with sorethytan laurate plus vitamin A concentrate.]

| Animal | Concentration of sorethytan laurate | | | | | |
|---|---|---|---|---|---|---|
|  | 0 mg., percent | 200 mg., percent | 300 mg., percent | 400 mg., percent | 600 mg., percent | 800 mg., percent |
| Rabbit #1 | 0 | 0 | 2 | 18 | 26 | 49 |
| Rabbit #2 | 0 | 0 | 2 | 12 | 27 | 51 |
| Rabbit #3 | 0 | 0 | 2 | 11 | 29 | 55 |
| Rabbit #4 | 0 | 0 | 3 | 15 | 31 | 61 |
| Rabbit #5 | 0 | 0 | 4 | 15 | 34 | 57 |
| Rabbit #6 | 0 | 0 | 2 | 9 | 29 | 58 |
| Mean | 0 | 0 | 3 | 14 | 29 | 56 |

From the foregoing, the concentration of dispersing agent at which the degree of hemolysis is negligible (up to 300 mg. of dispersing agent per 100 ml. of blood) has been established. There was then undertaken an investigation of intravenous injections of aqueous dispersions prepared in such a manner that the dispersing agent was present in the blood in concentrations less than the maximum of about 300 mg. per 100 ml. of blood, thereby affording a margin of safety.

*Study of the recovery of intravenously injected vitamins*

The approach in this study was to investigate the serum vitamin A and E levels of rabbits following the intravenous injection of aqueous dispersions of vitamins A and E in physiological saline solution. The general procedure was to inject 1.0 ml. of the test preparations per pound of body weight into the peripheral ear veins of the animals. Blood specimens were collected by making small incisions in the peripheral vein of the opposite ear, 2 or 3 minutes following the completion of the injection. Several additional blood specimens were taken thereafter. The clotted specimens were centrifuged and the serum analyzed for vitamin A, and for vitamin E. The aqueous dispersions were diluted and analyzed for vitamin A content and for E. The total serum content of the animals was estimated as 5% of the body weight. Calculation of the total serum vitamin A was made on this basis by multiplying serum vitamin concentration by total serum volume. A comparison was made between the amount of vitamin injected and the amount recovered in the blood stream following injection.

EXAMPLE 2

*Vitamin A alcohol-sorethytan laurate dispersion*

In the first study, serum vitamin A levels were determined after injection of a preparation containing 200 mg. per ml. of vitamin A alcohol (nonsaponifiable residue of fish liver oils, 212,000 μg. per g.) and 6.5 mg. per ml. of sorethytan laurate in 0.85% NaCl solution. The results are shown in Table 2. It will be noted that 2 minutes after the injection, only 16% of the injected vitamin A was recovered in the blood stream, while 3 hours after the injection, 8% of the injected vitamin A remained. The sorethytan laurate-vitamin A alcohol dispersion, therefore, disappears rapidly from the blood stream.

Since rises in blood vitamin A are usually mainly in the ester form, the blood levels following the injection of aqueous dispersions of vitamin A natural and synthetic esters were investigated on the hypothesis that the alcohol form might be unstable in high concentration in the blood stream.

EXAMPLE 3

*Vitamin A acetate-sorethytan laurate dispersion*

A dispersion was injected containing 390 μg. per ml. of vitamin A acetate and 6.5 mg. per ml. of sorethytan laurate. The results are shown in Table 2. Only 16% of the injected vitamin A remained 2 minutes after injection. The rate of disappearance closely resembled that of the vitamin A alcohol-sorethytan laurate dispersion.

EXAMPLE 4

*Natural distilled and synthetic esters of vitamin A-sorethytan laurate dispersion*

The next preparation injected was a dispersion of 400 μg. per ml. of natural distilled esters of vitamin A (approximately 200,000 μg. per g.) plus 6.5 mg. per ml. of sorethytan laurate. The results are shown in Table 2. At the end of 2 minutes, 26% of the injected vitamin A remained. The vitamin A esters did not disappear as rapidly in vivo as dispersions of either the free alcohol or the acetate. When 945 μg. per ml. of vitamin A esters was injected, the rate of disappearance of vitamin A in the blood stream was approximately the same as when smaller amounts were injected.

EXAMPLE 5

Since sorethytan laurate was not overly effective in maintaining dispersed vitamin A in the blood stream under these conditions, the effect of replacing sorethytan laurate with sorethytan oleate as dispersing agent was investigated. 1089 μg. per ml. of vitamin A alcohol plus 6.5 mg. per ml. of sorethytan oleate was injected. The results are shown in Table 2. At the end of 2 minutes only 12% of the injected vitamin A remained, while at the end of 2 hours, 0.5% remained in the blood stream. Thus sorethytan oleate-vitamin A alcohol dispersion disappears more rapidly than the sorethytan laurate—vitamin A dispersion.

EXAMPLE 6

In order to determine whether this disappearance was common to all the fat soluble vitamins, there was injected a dispersion of vitamin E, 1.0 mg. of vitamin E (mixed tocopherols, 347 mg. of vitamin E per g.) plus 4.8 mg. per ml. of sorethytan laurate per pound of body weight. The results are shown in Table 2. 80% of the injected vitamin E was found in the blood stream 3 minutes after completion of the injection. The vitamin E levels dropped rapidly following this. Apparently the vitamin E—sorethytan laurate dispersion disappears nowhere as rapidly as the vitamin A—sorethytan laurate dispersions.

EXAMPLE 7

*Natural and synthetic vitamin A esters—sorethytan oleate dispersion*

The levels following injection of a sorethytan oleate-vitamin A esters dispersion next were investigated. Intravenous injections were made employing preparations containing 180 μg., 1040 μg., and 1080 μg. per ml. of natural or synthetic vitamin A esters plus 6.5 mg. per ml. of sorethytan oleate. The results are shown in Table 2. At the end of 2 minutes, all of the injected vitamin A was recovered in the blood stream. The rate of disappearance afterwards was similar to that of the previous preparations. The sorethytan oleate-vitamin A esters combination therefore constitutes the optimal one in effecting the high blood levels theoretically required in increasing the rate of diffusion of small particles across the capillary membranes.

EXAMPLE 8

In order to test the effect of concentrating the test dose in a very small volume of injected material, a preparation containing 196 μg. of vitamin A esters and 6.5 mg. of sorethytan oleate per 0.1 ml. of dispersion were injected. 0.1 ml. of this dispersion was administered per pound of body weight. The results are shown in Table 2. Apparently, concentration of the test dose in a very small volume of solution does not affect the rate of disappearance of the vitamin A in the blood stream.

EXAMPLE 9 (a–d)

*Effect of vitamin E in stabilizing vitamin A dispersions*

Next the effect of vitamin E in stabilizing the vitamin A alcohol-sorethytan oleate dispersion in the blood stream was measured. Vitamin E has been known to stabilize vitamin A preparations in vitro. (a) A dispersion containing 26 mg. of sorethytan oleate, 775 µg. per ml. of vitamin A alcohol, and 17.5 mg. per ml. of mixed tocopherols was injected intravenously. The results are shown in Table 2. Only 17% of the injected vitamin A was recovered 2 minutes after completion of the injection. (b) A second preparation containing 1125 µg. of vitamin A alcohol per ml. plus vitamin E displayed the same rapid disappearance. Thus, mixed tocopherols are apparently ineffective under these conditions in maintaining in the blood stream the injected level of vitamin A alcohol dispersed with sorethytan oleate. In a similar manner, sorethytan laurate dispersions of (c) 775 µg. per ml. of vitamin A alcohol and (d) 1050 µg. per ml. of vitamin A esters plus 17.5 mg. per ml. of mixed tocopherols and 26 mg. per ml. of sorethytan laurate were prepared and injected. The results are shown in Table 2. Only 19% of the injected vitamin A alcohol and 11% of the injected vitamin A esters were recovered in the blood stream after the injection. Thus the same lack of protective activity was displayed with the sorethytan laurate dispersions as with the sorethytan oleate dispersions.

After having received repeated injections of aqueous dispersions as described above, four of the test animals were sacrificed and examined and it was found that there were no gross changes and it was observed that there was no hemolysis in the blood specimens following injection.

*Experiments on vitamin A transfer to milk following intravenous injection of aqueous dispersions of vitamin A*

The above examples show why the production of high blood levels of fat soluble vitamins by means intravenous injection of aqueous dispersions is a practical possibility. Since high blood levels provide in part the theoretical conditions for increased transfer of fat soluble vitamins from the blood to the capillary filtrate, the following examples establishes that applicant's inventive concept of increasing the vitamin concentration in animal milk is correct by measuring the effect of injecting sorethytan oleate—vitamin A esters dispersions upon the milk vitamin A secretion of dairy cows.

EXAMPLE 10

0.1 ml. per pound weight of a dispersion containing 230 mg. of vitamin A esters and 6.5 mg. of sorethytan oleate per 0.1 ml. of 1.85% NaCl solution was injected into the jugular vein of 5 dairy cows. One blood specimen was collected prior to the injection followed by blood specimens 3 minutes, 30 minutes and 60 minutes after the injection. The results are shown in Table 3. The serum

TABLE 2

[Recovery of fat-soluble vitamins in the blood stream of rabbits following intravenous injection.]

| Example No. | Vitamin injected | Dispersing agent | Total vitamin injected, µg. | Percent recovered Following dose | | |
|---|---|---|---|---|---|---|
| | | | | 2 min. | 60 min. | 180 min. |
| 2 | Vitamin A alcohol, 200 µg./ml | 6.5 mg./ml. SEL [1] | 1,760 | 24 | 9.2 | 6.5 |
| | | | 2,160 | 16 | 6.5 | 4.3 |
| | | | 1,950 | 21 | 12 | 11 |
| | | | 1,800 | 20 | 13 | 7.9 |
| | | | 1,800 | 20 | 9.3 | 7.3 |
| | | | 1,040 | 12 | 11 | 10 |
| | | | 2,020 | 4.5 | | |
| | | | 1,940 | 12 | | |
| | Average | | 1,885 | 16 | 11 | 8 |
| 3 | Vitamin A acetate, 390 µg./ml | 6.5 mg./ml. SEL [1] | 3,500 | 20 | 5.7 | 4.6 |
| | | | 4,250 | 11 | 3.4 | 2.7 |
| | Average | | 3,875 | 16 | 4.6 | 3.6 |
| 4 | Vitamin A esters, 945 µg./ml | 6.5 mg./ml. SEL [1] | 10,262 | 23 | 9.2 | 6.9 |
| | | | 9,696 | 22 | 11 | 8.8 |
| | | | 8,482 | 26 | 7.8 | 5.2 |
| | Average | | 9,480 | 24 | 9.3 | 6.9 |
| 5 | Vitamin A alcohol, 1,089 µg./ml | 6.5 mg./ml. SEO [2] | 12,250 | 15 | 1.1 | 0.6 |
| | | | 10,300 | 12 | 1.3 | 0.7 |
| | | | 10,900 | 14 | 1.4 | 0.3 |
| | | | 10,300 | 6.6 | 0.9 | 0.3 |
| | Average | | 10,937 | 12 | 1.2 | 0.5 |
| | | | | 2 min. | 10 min. | 20 min. |
| 6 | Vitamin E, 11.1 mg./ml | 4.8 mg./ml. SEL [1] | 8.2 mg. | 88 | 46 | 18 |
| | | | 8.8 mg. | 87 | 8 | 4 |
| | | | 10.8 mg. | 70 | 30 | 6 |
| | | | 9.8 mg. | 73 | 27 | 7 |
| | Average | | 9.4 mg. | 80 | 28 | 9 |
| 7 | Vitamin A esters: | | | | | |
| | 180 µg./ml. | | 1,800 | 99 | 95 | 94 |
| | 1,040 µg./ml. | 6.5 mg./ml. SEO [2] | 11,024 | 95 | 83 | 25 |
| | 1,098 µg./ml. | | 10,059 | 93 | 37 | 19 |
| | | | 9,585 | 104 | 42 | 14 |
| | | | 10,249 | 133 | 27 | 26 |
| | Average | | 10,254 | 106 | 49 | 20 |
| 8 | Vitamin A esters, 10.1960 µg./ml | 65 mg./ml. SEO [2] | 1,960 | 79 | | |
| | | | 2,352 | 111 | | |
| | Average | | 2,156 | 95 | | |
| | | | | 3 min. | 10 min. | 60 min. |
| 9a | Vitamin A alcohol, 775 µg./ml., mixed tocopherols, 17.5 mg./ml | 26 mg./ml. SEO [2] | 3,100 | 12 | | |
| | | | 5,713 | 30 | | |
| | | | 9,300 | 9 | | |
| | Average | | 6,704 | 17 | | |
| 9b | Vitamin A alcohol, 1,125 µg./ml., mixed tocopherols, 17.5 mg./ml | 26 mg./ml. SEO [2] | 8,425 | 12 | 3.2 | 3 |
| | | | 8,863 | 11 | 4.3 | |
| | Average | | 8,644 | 12 | 3.8 | |
| 9c | Vitamin A alcohol, 775 µg./ml., mixed tocopherols, 17.5 mg./ml | 26 mg./ml. SEL [1] | 5,193 | 18 | 7.5 | 3.8 |
| | | | 6,665 | 20 | 4.7 | 3.2 |
| | Average | | 5,929 | 19 | 6.2 | 3.5 |
| 9d | Vitamin A esters, 1,050 µg./ml., mixed tocopherols, 17.5 mg./ml | 26 mg./ml. SEL [1] | 6,825 | 14 | 8.9 | 6.9 |
| | | | 6,825 | 7 | 5.5 | 3.9 |
| | Average | | 6,825 | 11 | 7.2 | 5.4 |

[1] SEL = sorethytan laurate.  [2] SEO = sorethytan oleate.

vitamin A level rose from 87 μg. per 100 ml. per-injection to 1047 μg. per 100 ml. post injection. It was possible to recover all of the injected vitamin A in the blood stream 3 minutes after completion of the injection. Milk specimens were collected for 24 hours prior to administration of the test dose and 48 hours after the test dose. They were examined for milk vitamin A content. The results are shown in Table 4. The concentration of milk vitamin A rose from an average of 56 μg. per 100 ml. during the pre-test period to an average concentration of 122 μg. per 100 ml. during the first day following the test dose, and to average concentration of 80 μg. per 100 ml. during the second day following the test dose. The total vitamin A secreted rose from 4701 μg. during the 24 hours preceding the test dose to 9947 μg. and 5675 μg. in the first and second days, respectively, following the test dose.

A comparison was made by administering the same dose orally to two additional animals by quantitatively rinsing the dose through a stomach tube. Blood specimens were collected prior to the dose and 3½, 4 and 7 hours thereafter. The results are shown in Table 3.

TABLE 3

[Serum vitamin A levels of cows after administration of 230 μg. of vitamin A per lb. body weight by intravenous injection, oral aqueous dispersion, and oral oily solution.]

| Group | Pre-test, vit. A, μg. percent | 2 min., vit. A, μg. percent | 30 min., vit. A, μg. percent | 60 min., vit. A, μg. percent |
|---|---|---|---|---|
| 1. I. V. Inj | 102 | 1,065 | 292 | 232 |
|  | 78 | 1,015 | 238 | 208 |
|  | 80 | 1,035 | 422 | 367 |
| Mean | 87 | 1,047 | 317 | 269 |
| 2. Oral, aq | 79 | 84 | [2] 139 |  |
|  | 106 | [1] 136 | [2] 209 |  |
|  | 128 | [1] 148 | [2] 103 |  |
| Mean | 103 | [1] 112 | [2] 150 |  |
| 3. Oral, oil | 112 | [3] 123 | [4] 125 |  |
|  | 100 | [3] 72 | [4] 72 |  |
|  | 85 | [3] 137 | [4] 127 |  |
| Mean | 99 | [3] 111 | [4] 125 |  |

[1] 4 hours after test dose.
[2] 7 hours after test dose.
[3] 3.5 hours after test dose.
[4] 6.5 hours after test dose.

TABLE 4

[Milk vitamin A secretion of cows following administration of 230 μg. of vitamin A esters per lb. of weight by intravenous injection, oral aqueous dispersion, and oral oily solution.]

| Group | Milk vitamin A secretion | | | | | | | | | | | |
|---|---|---|---|---|---|---|---|---|---|---|---|---|
|  | μg./100 ml. | | | | | | μg. Total | | | | | |
|  | Pre-test, a. m. | Pre-test, p. m. | 1st day, a. m. | 1st day, p. m. | 2nd day, a. m. | 2nd day, p. m. | Pre-test, a. m. | Pre-test, p. m. | 1st day, a. m. | 1st day, p. m. | 2nd day, a. m. | 2nd day, p. m. |
| 1. Intravenous inj | 80 | 69 | 128 | 169 | 85 | 68 | 3,600 | 2,760 | 4,480 | 8,120 | 3,400 | 3,400 |
|  | 69 | 65 | 113 | 105 | 84 | 56 | 2,070 | 2,920 | 3,960 | 5,250 | 3,180 | 2,800 |
|  | 63 | 45 | 113 | 101 | 131 | 59 | 1,890 | 900 | 2,260 | 2,525 | 2,620 | 1,650 |
|  | 26 |  | 103 | 95 |  |  |  |  | 2,910 | 4,120 |  |  |
|  | 29 |  | 113 | 181 |  |  |  |  | 5,520 | 10,590 |  |  |
| Mean | 53 | 59 | 114 | 130 | 100 | 61 | 2,512 | 2,189 | 3,826 | 6,121 | 3,066 | 2,619 |
| 2. Oral aq | 64 | 56 | 45 | 87 | 118 | 78 | 3,200 | 1,960 | 1,800 | 4,780 | 4,140 | 4,290 |
|  | 52 | 62 | 78 | 114 | 118 | 78 | 1,040 | 930 | 1,170 | 2,280 | 1,780 | 1,790 |
| Mean | 58 | 59 | 62 | 101 | 118 | 78 | 2,120 | 1,445 | 1,485 | 3,530 | 2,960 | 3,040 |
| 3. Oral, oil | 53 | 45 | 45 | 84 | 96 | 85 | 795 | 585 | 585 | 1,260 | 1,780 | 1,275 |
|  | 78 | 55 | 62 | 73 | 106 | 79 | 2,730 | 1,370 | 1,550 | 2,780 | 3,180 | 2,770 |
|  | 45 | 56 | 45 | 48 | 76 | 78 | 1,125 | 1,450 | 1,900 | 1,200 | 1,900 | 2,340 |
| Mean | 59 | 51 | 51 | 68 | 93 | 81 | 1,550 | 1,138 | 1,011 | 1,746 | 2,286 | 2,138 |

The serum vitamin A content rose gradually from 103 μg. per 100 ml. to 150 μg. per 100 ml. within the 7 hour period following ingestion of the test dose. Milk specimens were collected for 24 hours preceding the test dose and for 48 hours following the test dose. The results are shown in Table 4. The milk vitamin A content rose from 54 μg. per 100 ml. preceding the test dose to an average of 70 μg. per 100 ml. preceding the test dose to an average of 70 μg. per 100 ml. in the first and an average of 81 μg. per 100 ml. in the second day following the test dose. The total vitamin A secretion rose from a pre-test value of 3680 μg. to 4710 μg. in the first day after the dose and 5562 μg. in the second day following the dose.

As a further comparison, 3 additional animals were given the same vitamin A dissolved in corn oil. A blood specimen was collected previous to the test dose and additional specimens 3½ and 6½ hours following the test dose. The results are shown in Table 3. Milk specimens were collected for the 24 hour period preceding the test dose and 48 hours following the test dose. The results are shown in Table 4. The milk vitamin A level rose slowly from 55 μg. per 100 ml. pre-test to an average concentration of 59 μg. per 100 ml. in the first day following the test dose and an average concentration of 87 μg. per 100 ml. on the second day following the test dose. The total vitamin A secreted was 2688 μg. in the 24 hours preceding the test dose and 2757 μg. and 4424 μg. in the first and second days, respectively, following the test dose.

The results indicate that intravenous injections are far more effective in producing an increased transfer of vitamin A from blood to milk and that the transfer occurs far sooner than when the vitamin A is given orally in either aqueous dispersion or oily solution. The transfer occurs sooner with aqueous dispersions than with the oily solution given orally, and the magnitude of the transfer appears to be greater with the aqueous dispersion.

The results presented indicate that the production of high vitamin A and E levels by means of intravenous injections of aqueous dispersions of these vitamins can be achieved. The dispersing agents employed were sorethytan laurate and sorethytan oleate. No hemolysis occurs when 200 mg. or less of the dispersing agent are present in 100 ml. of whole rabbit blood. A rapid disappearance from the blood stream of injected vitamin A followed the administration of sorethytan laurate dispersions of vitamin A alcohol, vitamin A acetate, and mixed natural esters of vitamin A in 0.85% NaCl solution. Only 16%, 16% and 26% of the injected vitamin A alcohol, acetate, and the natural or synthetic esters, respectively, were recovered two minutes after completion of the injection. Following injection of a sorethytan oleate dispersion of vitamin A alcohol, 12% of the injected vitamin remained in the blood stream two minutes after injection. When a sorethytan oleate—vitamin A esters dispersion was injected, however, 100% of the administered vitamin was recovered two minutes after injection. 80% of the injected vitamin E in sorethytan laurate dispersion was recovered. Vitamin E was ineffective in reducing the rate of disappearance of injected vitamin A from the blood stream.

Milch cows were given (1) intravenous injections of a sorethytan oleate—mixed vitamin A esters dispersion, (2) the same dispersion orally, and (3) the same vitamin A dissolved in corn oil. In the 24 hours following the test dose, the intravenous injection group exhibited a 15-fold increase in milk vitamin A level over that of the oral oily solution group, and a 3-fold increase over the oral aqueous dispersion group.

Accordingly, the intravenous injection of fat soluble vitamins in providing the high concentration gradient theoretically required for the increased transfer of these vitamins across capillary membranes has been shown to have practicability and, furthermore, the relatively high increase of vitamin A level in milk from the intravenous injection group over oral administration makes the application of the dispersion of value especially in the treatment of local fat soluble vitamin deficiency. Vitamin A esters, as that term is employed herein, means either natural or synthetic vitamin A and esters and particularly those esters having at least 16 carbon atoms in the ester grouping and usually preponderantly palmitate esters.

The features and principles underlying the invention described above in connection with specific exemplifications will suggest to those skilled in the art many other modifications thereof. It is accordingly desired that the appended claims shall not be limited to any specific feature or details thereof.

I claim:

1. A veterinary medicine process for supplying the requirements of vitamin A to animals comprising intravenously injecting an isotonic aqueous dispersion of a fat-soluble vitamin A ester, said dispersion containing 0.005 to 0.06 g. per ml. of sorethytan monooleate as a dispersing agent and .0001 to 0.1% by weight of said vitamin A ester.

2. A process for increasing the vitamin A content of milk of ruminants comprising intravenously injecting an isotonic aqueous dispersion of fat-soluble vitamin A ester into said ruminant, said aqueous dispersion containing 0.0005 to 0.06 g. per ml. of sorethytan monooleate as a dispersing agent and .001 to 0.1% by weight of said vitamin A ester.

References Cited in the file of this patent

UNITED STATES PATENTS 2,417,299 Freedman _____ Mar. 11, 1947

OTHER REFERENCES

Lesser: Drug and Cos. Ind., vol. 73, July 1953, p. 116.

Sobel: (1) Am. Jour. of Diseases of Children, May 1947, p. 544.

Sobel: (2) Jour. of Nutrition, Feb. 10, 1948, pp. 228 and 232.